Figure 1:
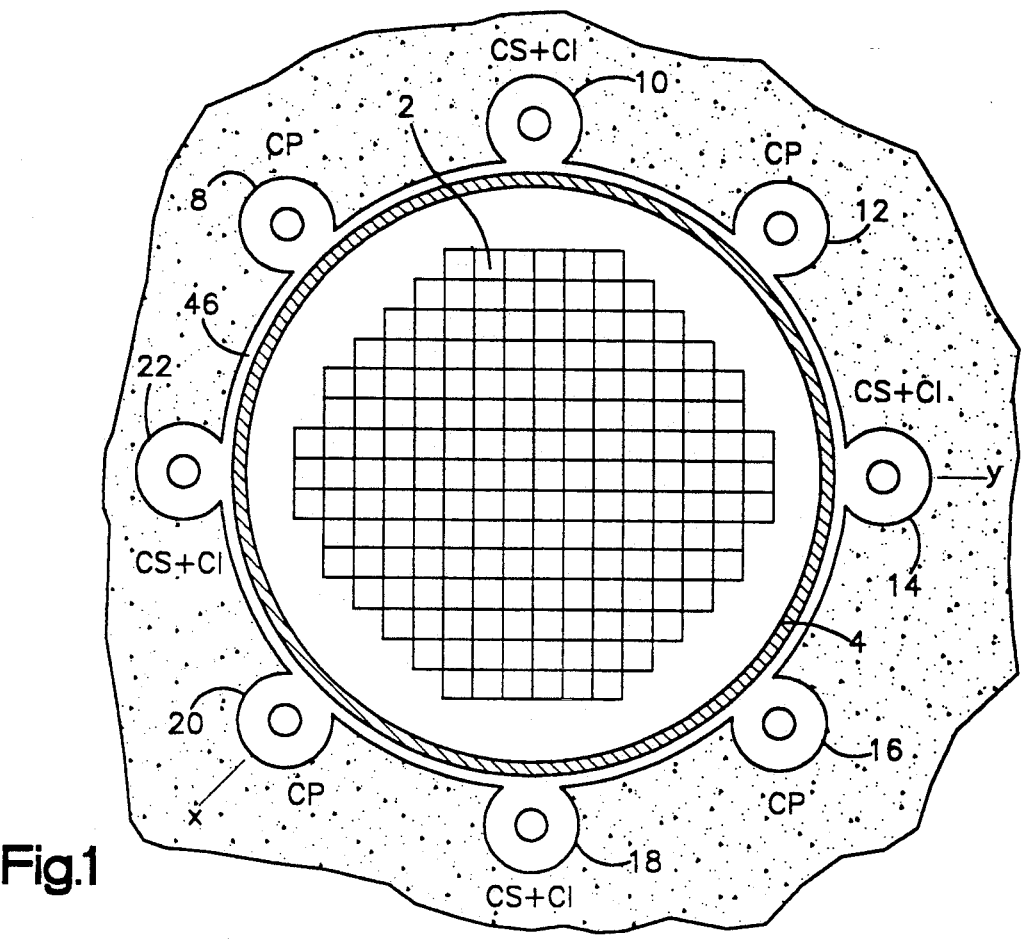

United States Patent [19]

Bacconnet

[11] Patent Number: 5,249,207
[45] Date of Patent: Sep. 28, 1993

[54] APPARATUS FOR MONITORING THE NEUTRON FLUX OF A NUCLEAR REACTOR

[75] Inventor: Eugène Bacconnet, Marcoussis, France

[73] Assignee: Commissariat A L'Energie Atomique, France

[21] Appl. No.: 916,013

[22] Filed: Jul. 17, 1992

[30] Foreign Application Priority Data

Jul. 18, 1991 [FR] France .................. 91 09083

[51] Int. Cl.⁵ .......................... G21C 17/00
[52] U.S. Cl. ...................... 376/254; 376/255
[58] Field of Search ........... 376/254, 255; 250/390, 250/391, 392; 976/DIG. 238

[56] References Cited

U.S. PATENT DOCUMENTS

| | | | |
|---|---|---|---|
| 4,086,490 | 4/1978 | Todt, Sr. .................. | 250/385 |
| 4,235,670 | 11/1980 | Alzaidi ..................... | 376/255 |
| 4,404,164 | 9/1983 | Kopp et al. ............... | 376/154 |
| 4,495,144 | 1/1985 | Lingren et al. ........... | 376/255 |
| 4,568,514 | 2/1986 | Lingren et al. ........... | 376/255 |
| 4,634,568 | 1/1987 | Wimpee et al. .......... | 376/154 |
| 4,655,994 | 4/1987 | Greenberg ................ | 376/254 |

OTHER PUBLICATIONS

I.E.E.E. Transactions on Nuclear Science—A Two-Range System For Ex-Core Neutron Flux Monitoring. Johnson and Meijer; New York, U.S.A.; vol. NS; Feb. 17, 1970; No. 1; pp. 572–580.

A Measurement of the Neutronic Interaction Between Two Cylindrical Moderators By Grosshog Nuclear Science and Eng., 42, No. 1 pp. (16–22) 1970.

Primary Examiner—Donald P. Walsh
Assistant Examiner—Meena Chelliah
Attorney, Agent, or Firm—Pearne, Gordon, McCoy & Granger

[57] ABSTRACT

Apparatus for monitoring the neutron flux of a nuclear reactor in biological protection concrete (6) surrounding the vessel (4) containing the reactor core (2) and having, in vertical shafts (8 to 22) located in the concrete in the vicinity of said vessel (4), a certain number of neutron detecting devices, characterized in that each shaft is provided with a central, aluminium housing tube (24) and several peripheral, aluminium tubes (28), the central tube (24) being reserved for the housing of the boron deposit proportional counter and the peripheral tubes for the housing of the fission chambers, each maintained at a different height by support means connected to the tubes.

6 Claims, 3 Drawing Sheets

APPARATUS FOR MONITORING THE NEUTRON FLUX OF A NUCLEAR REACTOR

The present invention relates in general terms to the monitoring of the neutron flux present in the immediate vicinity of the core of a nuclear reactor in operation and more particularly relates to the choice of suitable neutron detectors and their arrangement relative to the reactor core.

A description will firstly be given of the state of the art in this field with reference to pressurized water reactors (PWR) having a power of 1300 MW, such as the reactors used in the PALUEL French nuclear power station.

The detection and monitoring of the neutron flux in the vicinity of a nuclear reactor requires, in order that the results obtained are significant, that said monitoring takes place in different azimuth directions relative to the vertical axis of the reactor and also in accordance with its height, so as to be able to make a three-dimensional flux map.

To this end and in conventional manner, the detectors are positioned in the immediate vicinity of the metal vessel containing the core fuel elements and are inserted in vertical shafts parallel to the reactor axis located in the biological protection concrete of said reactor.

In the prior art, the neutron flux measuring instruments are known as cascades or chains, the term chain or cascade designating in overall manner a neutron detector, its accompanying electronics and connecting devices permitting the connection thereof to recording instruments outside the reactor.

Conventionally for covering the entire range of neutron fluences extending over several decades, e.g. from 1 to $10^{11}$ neutrons/cm$^2$/sec, use is made of several neutron detector types, each being specific to part of the said range. It is therefore known to cover such a neutron fluence measuring range by using three different measuring chain types, each having one of the three detectors. For low power levels and in particular on starting up the reactor, use is made of "source" chains equipped with proportional counters operating in pulse-like manner.

For average power levels, use is made of "intermediate" chains equipped with boron ionization chambers compensated with respect to gamma radiation. For operating at the nominal power level, use is made of "power" chains equipped with uncompensated boron ionization chambers. The latter, and this applies in the 1300 MW PWR reactors designed by FRAMATOME and equipped by MERLIN-GERIN, provided with several stages and has six sections distributed within the same shaft over the entire reactor height.

A description will be given hereinafter with reference to FIGS. 1 and 2 of the installation procedure of neutron detection chains in a 1300 MW PWR reactor.

FIG. 1 shows in section along the axis the core 2 of a reactor contained in a vessel 4. In the biological protection concrete 6 there are eight vertical shafts 8, 10, 12, 14, 16, 18, 20 and 22 in the immediate vicinity of the vessel 4 and containing neutron measuring chains distributed in the manner indicated hereinafter.

The shafts 10, 14, 18 and 22 contain a "source" chain and an "intermediate" chain, whereas the shafts 8, 12, 16 and 20 contain "power" chains. FIG. 2 is a diagrammatic elevation section view along line XY of FIG. 1 showing the arrangement of the source (CS) and intermediate (CI) chains in the shaft 14 and the very special arrangement in the form of six juxtaposed sections in accordance with the height of the power chain (CP) in the shaft 20.

This prior art is in particular described in the article (in French) "Measurements outside the core in PALUEL-type 1300 MW pressurized water reactors" by DUCHENE, BUREL and TIXIER, published in L'Onde Electrique, March 1987, vol. 67, No. 2.

The prior art described hereinbefore leads to a certain number of disadvantages, which are obviated by the present invention. These disadvantages include the fact that the two chains of the shafts such as 14, namely the intermediate chain and the source chain are positioned one above the other in the same shaft and the six sections of a power chain are also distributed and interconnected in superimposed manner in the same shaft, so that in the case of a failure of one of the chains it is virtually necessary to dismantle all the detectors of the same shaft, which is a difficult operation and which can only take place with the reactor shut down and which consequently requires the replacement of all the chains or chain elements, whereas all of them are not in fact damaged. Therefore the maintenance of such an installation is particularly expensive.

Another disadvantage of the prior art is the relatively large number of shafts in the concrete necessary for the complete monitoring of the neutron fluence, usually eight of these being provided.

Another disadvantage is due to the need of using in parallel three neutron detector types, which makes manufacture and maintenance more complicated.

The present invention specifically relates to an apparatus for monitoring the neutron flux of a nuclear reactor making it possible to overcome the aforementioned disadvantages, whilst still retaining the same neutron measurement qualities.

This nuclear reactor neutron flux monitoring apparatus located in the biological protection concrete surrounding the vessel containing the reactor core and having, in vertical shafts provided in the concrete in the vicinity of said vessel, a certain number of neutron detectors, each being associated in the form of assemblies, chains or cascades with its electronics and connections, the chains being of three different types to cover the neutron fluence range extending over several decades, namely "source" chains for the low reactor power levels, "intermediate" chains for the average reactor power levels and "power" chains when the reactor is being operated at a high power level, characterized in that the three types of chains are formed with the aid of detectors, whereof at least one is a fission chamber able to operate in the pulse, fluctuation or current mode, in that the shafts are equipped with identical neutron detectors, namely for each of them a sensitive detector and a certain number of fission chambers distributed over the reactor height, each detector being located in a tube extending over the height of the shaft and issuing outside the reactor so as to permit its introduction and/or removal independently of the other detectors.

Preferably, the three chain types are formed with the aid of two detector types, namely a boron deposit proportional counter for the source chain and the fission chamber for the intermediate and power chains.

Thus, according to the invention, the different neutron detectors used are in each case located in a metal tube which is transparent to the neutrons and open outside the reactor, which in simple manner solves the problem of maintenance in the case of a failure in one detector, because said arrangement permits the introduction and/or removal of damaged detectors in an individual manner. This is a first and very important advantage compared with the prior art.

Moreover, the invention makes use of a procedure already known, particularly from U.S. Pat. No. 4,634,568, according to which it is possible to use in a very wide neutron fluence range, the same ionization chamber of the fission type by simply varying its operating mode. Thus, the intermediate and power chain detectors are formed with the aid of a single fission chamber type able to operate according to three different modes, namely the pulse, fluctuation and current modes, the source chain being normally formed by a boron deposit proportional counter, as in the prior art.

In particular, the high sensitivity detector used in the source chain can be a $BF_3$ counter, a helium 3 counter and possibly even a high sensitivity fission chamber operating in the pulse mode.

For example, the source chains are able to cover the neutron fluence range from 1 to $10^5$ neutrons/cm$^2$/sec and the intermediate and power chains are constituted by the same fission chamber type covering in the pulse mode the range $10^2$–$5.10^7$ neutrons/cm$^2$/sec, in the fluctuation mode the range $10^6$ to $10^{10}$ neutrons/cm$^2$/sec and in the current mode the range $10^8$ to $10^{11}$ neutrons/cm$^2$/sec. This solves the problem of reducing the number of neutron detector types necessary for monitoring the reactor.

Finally, the fact that in each shaft there are three source, intermediate and power type chains makes it possible to reduce the number of shafts provided in the biological protection concrete around the reactor vessel. It is only necessary to have four such shafts distributed at 90° from one another to obtain an information quality equivalent to that obtained with eight shafts in the prior art.

According to an embodiment of the invention which is particularly interesting, each shaft is equipped with a central aluminium housing tube and several peripheral aluminium tubes, the central tube being reserved for the housing of the boron deposit proportional counter and the peripheral tubes to the housing of the fission chambers, each maintained at a different height by support means connected to the tubes.

Even more specifically, there are six fission chambers distributed over the reactor height, each being located in one of the six peripheral tubes in a helical, three-dimensional arrangement around the central tube axis. This helical distribution around the axis of the six fission chambers distributed over the reactor height makes it possible to monitor the evolution of the neutron fluence over the height of the reactor for intermediate and nominal power levels of the latter.

The invention is described in greater detail hereinafter relative to non-limitative embodiments and with reference to the FIGS., wherein show:

FIG. 1 A plan view in section of a reactor and monitor according to the invention.

Figure 2:
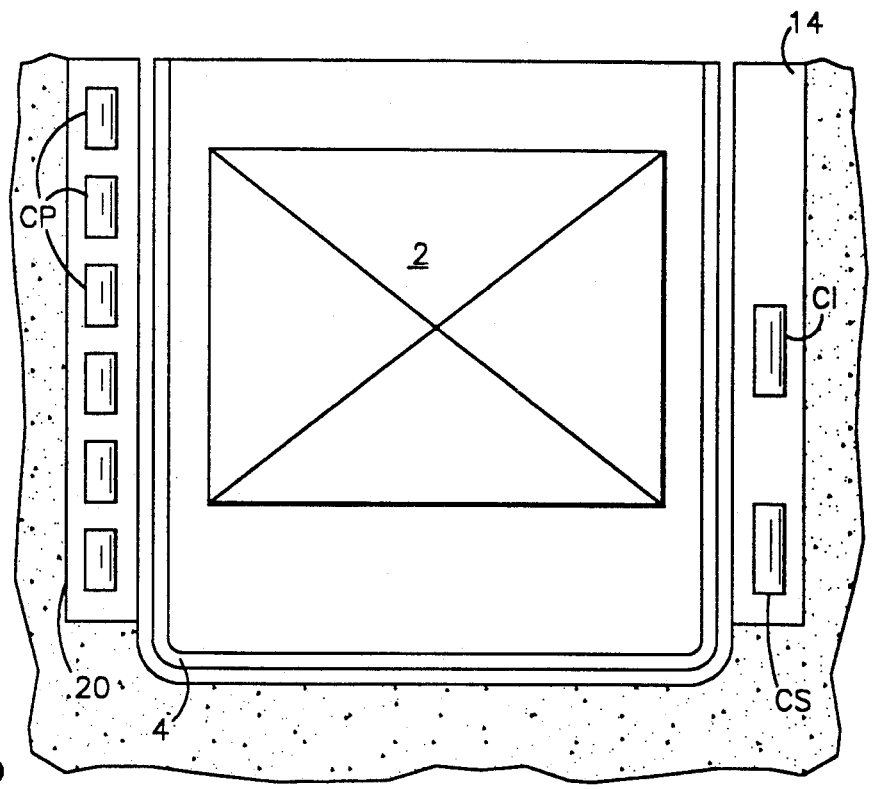

FIG. 2 A side view in section along plane x-y of FIG. 1.

Figure 3:
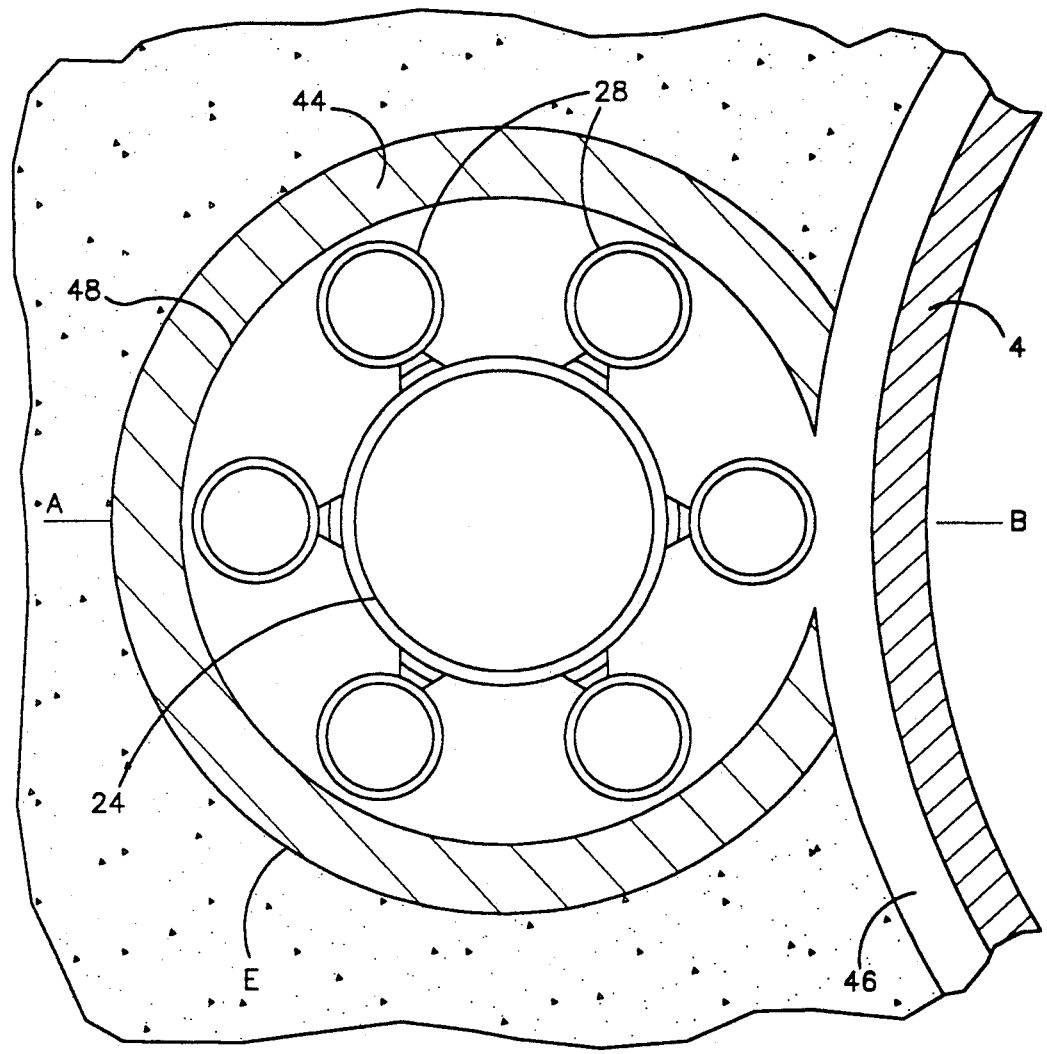
Figure 4:
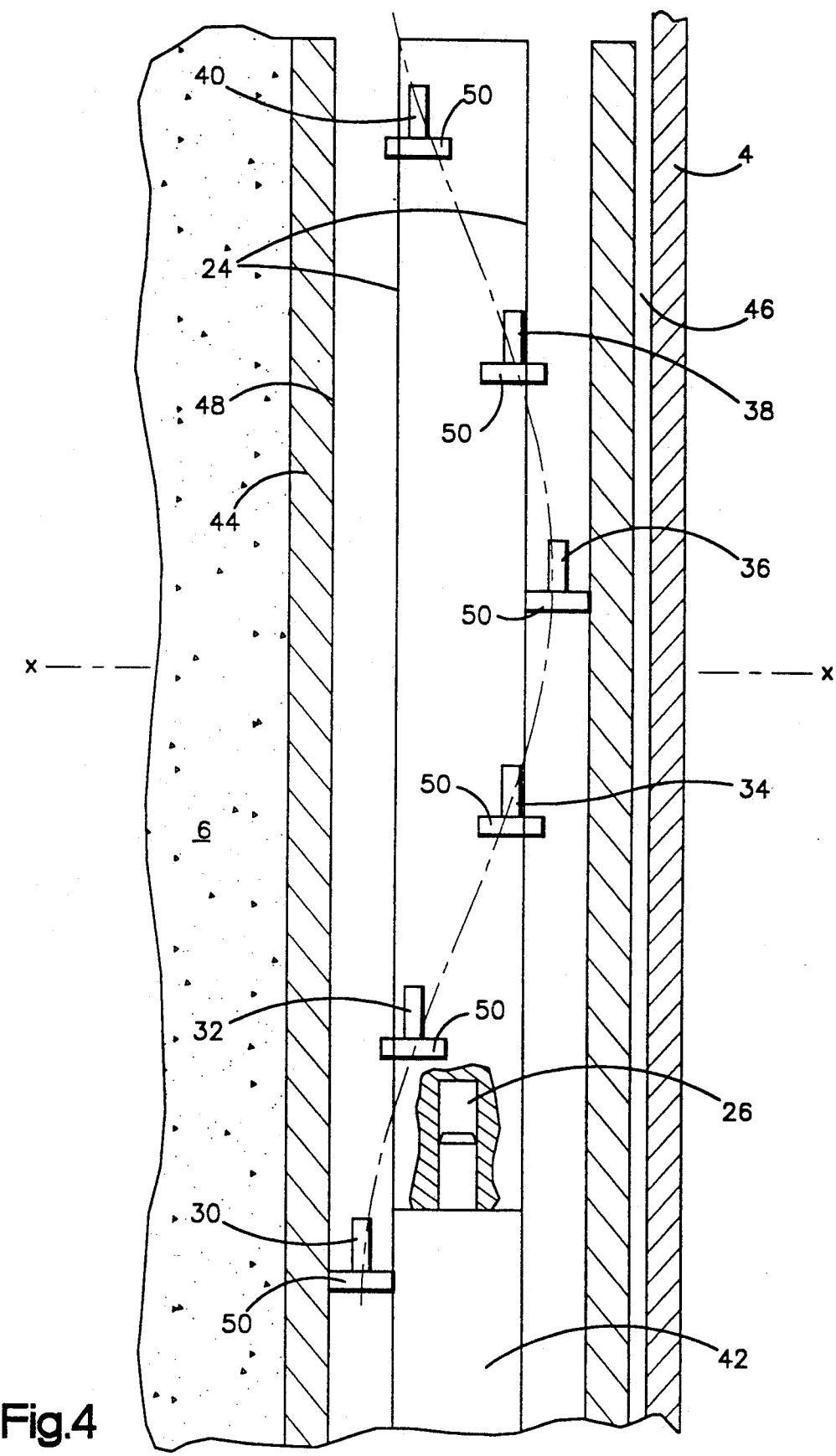

FIG. 3 A section along the horizontal plane X—X of FIG. 4 showing an exemplified arrangement of the neutron detector housing tubes in one of the shafts located in the concrete.

FIG. 4 A vertical section along line A-B of FIG. 3 showing in elevation the installation structure of the aluminium tubes in one of the shafts of the concrete structure.

In the embodiment of FIG. 3 is shown a central tube 24 of a detector housing structure, said tube 24 containing a boron deposit proportional counter 26 in FIG. 4 and which constitutes the "source" chain of the shaft in question. Around the central tube 24 are distributed six peripheral tubes 28, all made from aluminium in the same way as the tube 24 and whereof each contains one of the six fission chambers 30, 32, 34, 36, 38 and 40 in FIG. 4. According to the invention, the boron deposit counter 26 of the source chain is preferably located between the two lower fission chambers 30, 32 on a bracket 42 in the bottom of the central channel. This arrangement is preferred, but is in no way limitative and other arrangements could be envisaged with respect to the positioning of said counter 26 at any level in the tube 24, provided that it is located between two fission chambers in such a way that they do not form a neutron shield with respect to the said counter 26. On the periphery of the peripheral tubes is provided a polyethylene layer 44 serving as a moderator and collimator for the neutron flux, said layer 44 also having a cadmium charge acting as a focussing medium (as described in the aforementioned article in l'Onde Electrique).

In FIG. 4, the section of the apparatus of FIG. 3 shows the reactor vessel 4, the empty space 46 between the vessel and the biological protection concrete 6, as well as the structure maintaining the neutron detectors located in the space 46 in the concrete 6. It is also possible to see the tube 48 enveloping the peripheral tubes 28 in the vicinity of the layer 44 constituting the polyethylene moderator with the cadmium focussing medium. FIG. 4 also shows the different fission chambers 30 to 40 fixed to positioning abutments 50, which can be formed in known manner. As can be gathered from what has been stated hereinbefore, each of the fission chambers 30, 32, 34, 36, 38 and 40 is fixed in one of the peripheral tubes 28 with a height displacement from one chamber to the next, so as to cover the neutron flux from over the entire height of the reactor.

According to the invention, these fission chambers operate according to three different modes, namely the pulse mode, fluctuation mode and current mode, so that they are specific to a given neutron fluence range, as explained hereinbefore. Switching from one fission chamber operating mode to another takes place manually or automatically and forms part of the know-how of the Expert.

Each neutron detector is independent of the others and can be separately introduced or removed, so that a fault on one of them only requires the replacement of the defective element and not six sections in the case of power chains or the proportional counter and compensated boron deposition chamber in the case of the source and intemediate chains in accordance with the prior art.

Moreover, the fission chambers with multiple operating modes used as detectors are more robust than boron ionization chambers, which increases the life and operational reliability of the detectors. Finally, in the structures according to the invention, each shaft has all three source, intermediate and power chains, so that it is merely necessary to have four such shafts distributed at 90° from one another around the reactor vessel, in place of the eight shafts required in the prior art, as a result of the distribution of the latter with two different types. This is a very important advantage, because the shafts made in the concrete are expensive structures and reduce the biological protection of the concrete.

According to the invention, it is essential that the detector-installing structure is formed from unitary tubes issuing outside the reactor for the introduction or removal of the detectors. In most cases, it would be natural for these tubes to issue onto the upper slab covering the reactor, but in certain operating modes these tubes may issue beneath the reactor, but this would mean that the detectors would be introduced through the bottom of the concrete structure.

The invention is not limited to the embodiment described hereinbefore and in fact covers all variants thereof.

The detector housing tubes can be optionally made from zirconium or one of its alloys, such as zircaloy, or a stainless material such as steel.

I claim:

1. Apparatus for monitoring neutron flux of a nuclear reactor located in biological protection concrete (6) surrounding a vessel (4) containing a reactor core (2) and having, in vertical shafts (8 to 22) located in the concrete in the vicinity of said vessel (4), a certain number of neutron detectors, each being associated in the form of assemblies, cascades or chains with electronics and connections, the chains being of three different types in order to cover a neutron fluence range extending over several decades, namely "source" chains for the low reactor power levels, "intermediate" chains for the medium power levels and "power" chains when the reactor is operating at high power, characterized in that the three chain types include detectors, at least one of which is a fission chamber (30, 32, 34, 36, 38, 40) able to operate in the pulse mode, fluctuation mode or current mode, and each of the shafts is equipped with identical neutron detectors, comprising a sensitive detector (26) and a certain number of the fission chambers 30, 32, 34, 36, 38, 40) distributed over the reactor height, each detector being located in a tube (24, 28) extending over the shaft height and extending outside the reactor to permit its introduction and/or removal independently of the other detectors.

2. Neutron flux monitoring apparatus according to claim 1, characterized in that the three chain types include two detector types, namely a proportional counter for the "source" chain and the fission chamber for the "intermediate" and "power" chains.

3. Nuetron flux monitoring apparatus according to claim 2, characterized in that the proportional counter is a boron deposit counter.

4. Neutron flux monitoring apparatus according to claim 1, characterized in that each shaft is equipped with a central housing tube (24) and several peripheral housing tubes (28), the central tube (24) being reserved for the housing of the sensitive detector and the peripheral tubes for the housing of the fission chambers, each maintained at a different height by support means (50) connected to the tubes.

5. Neutron flux monitoring apparatus according to claim 4, characterized in that at least one of the housing tubes is made from aluminum.

6. Neutron flux monitoring apparatus according to claim 4, characterized in that there are six fission chambers (30, 32, 34, 36, 38, 40) distributed over the reactor height, each being located in one of the six peripheral tubes (28) in accordance with a spatial, three-dimensional arrangement around the axis of the central tube (24).

* * * * *